A. QUASTENBERG.
ELECTROMAGNET.
APPLICATION FILED NOV. 2, 1911.

1,025,020.  Patented Apr. 30, 1912.

Witnesses:

Inventor
Alfred Quastenberg
by James L. Norris Jr.
Atty.

UNITED STATES PATENT OFFICE.

ALFRED QUASTENBERG, OF ERFURT, GERMANY.

ELECTROMAGNET.

1,025,020.  Specification of Letters Patent.  Patented Apr. 30, 1912.

Application filed November 2, 1911. Serial No. 658,207.

*To all whom it may concern:*

Be it known that I, ALFRED QUASTENBERG, a subject of the German Emperor, residing at Erfurt, Kingdom of Prussia, Germany, have invented certain new and useful Improvements in or Relating to Electromagnets, of which the following is a specification.

My invention has reference to improvements in or relating to electro-magnets.

For various industrial purposes, magnets are made, the polar surfaces of which form a portion of a cylindrical surface, and are arranged next to each other in the direction of the cylindrical axis. In order to enable the winding of the magnet to be made in a simple and cheap manner, and in order to economize space, a coil is placed approximately concentrically around the polar arc, or concentrically to the axis of the cylinder which axis at the same time forms the yoke of the magnet. This however has the drawback that the lines of force appearing at the free side of the coil, and going around the same, exercise a disturbing action, so that for instance a drum surrounding the whole magnet system and made of non-magnetic material, shows magnetic properties also at the side situated away from the magnetic poles. This drawback is completely obviated in a simple manner by the present invention by arranging above the portion of the coil left free by the poles, horse-shoe shaped iron bars the ends of which are maintained at a suitable distance from the iron of the yoke, and which are secured in their position by means of diamagnetic material. The horse-shoe shaped iron bars collect magnetic lines of force appearing at the free side of the coil, and thus themselves become magnets, the poles of which are situated opposite the yoke of the main magnet, so that magnetic shunt fields are formed between the poles of the said auxiliary magnets and the yoke, while above the outer surface of the coil are situated the indifferent or neutral zones of the said auxiliary magnets, so that on that side of the cylinder, there is no magnetic action outward. Induction in the magnetic shunt thus produced, can be kept by suitable dimensioning of the auxiliary magnets and by a suitable choice of the distance of their poles from the yoke of the main magnet, within limits which make it practically impossible for leakage lines to appear at the outer surface at the side of the cylinder not inclosed by the magnet poles. The single horse-shoe shaped bars can be, if necessary, also combined into one suitably shaped iron cap.

Several constructions according to this invention, are illustrated in the accompanying drawings in which—

Figure 1:
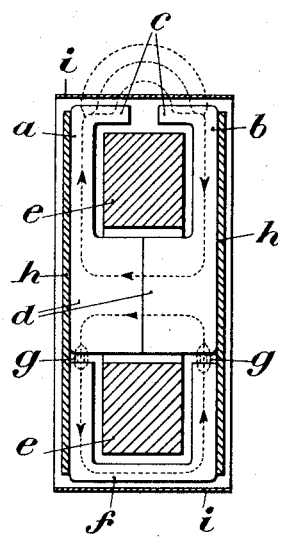
Figure 3:
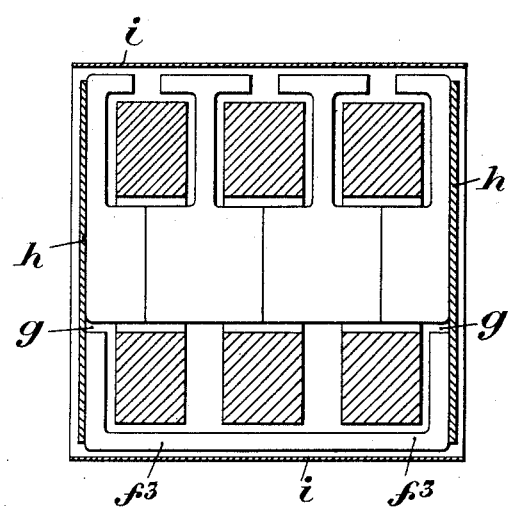
Figure 2:
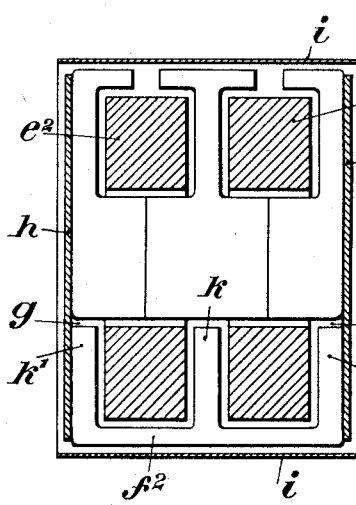
Figure 4:
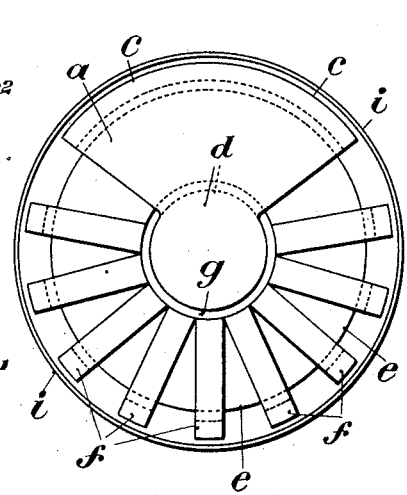

Figure 1 shows the arrangement of a magnet with two poles and one coil, Fig. 2 the arrangement of a magnetic system with three poles and two coils, the outer poles of which have the same polarity, which is of opposite sign to the polarity of the central pole. Fig. 3 shows the arrangement of a four-pole magnet system with three coils, the polarity of the adjoining poles alternating. Fig. 4 shows the front elevation of the magnetic system with the covering plate removed.

As will be clear from the drawing, Fig. 1 shows the simplest form of such a magnet. The iron body of the magnet consists of two parts $a$ and $b$, the polar surfaces $c$ of which, as shown in Fig. 4, form a portion of a cylindrical surface, while the yoke pieces $d$ form the axis of the cylinder. In suitable recesses in the iron bodies $a$ and $b$ is arranged the coil $e$, in the construction illustrated concentrically with the axis of the cylinder. On the portion of the coil left exposed by the polar surfaces, are arranged over the circumference of the cylinder several bars $f$ of soft iron bent to the shape of a horse-shoe. The ends of the said bars are opposite the yoke $d$ of the main magnet, and are held at a certain distance $g$ from the latter by disks $h$ of diamagnetic material. The whole device is surrounded by a diamagnetic drum $i$. During the passage of current through the coil $e$, the magnet consisting of the parts $a$ and $b$ is strongly excited in the known manner, so that at that part of the casing $i$ which lies in front of the polar surface $c$, there is produced a strong magnetic field in the direction of the axis. The leakage lines produced by the coil $e$ at the remaining portions of the circumference of the cylinder, are collected by the bars $f$, the latter becoming at the same time magnets and forming between their ends and the opposite yoke $d$ of the main magnet in the intermediate space $g$, magnetic shunt fields, while above the outer surface of the coil are situated the neutral zones of the said auxiliary magnets $f$, so that there is no magnetic action outward at this side of the cylinder $i$. The induction in the magnetic shunts thus formed, can be retained, by suitable dimensioning of the auxiliary magnets and by a suitable choice of the distance $g$ of their poles from the yoke $d$ of the main magnet, within limits which practically render the appearance of leakage lines impossible on the outer surface at the side of the cylinder which is not inclosed by the magnet poles.

In the construction shown in Fig. 2, the coils $e^2$ through which currents pass in opposite directions produce a pole at $k$, while at the ends $k'$ of the bar $f^2$ similar poles are produced.

In the construction shown in Fig. 3, in which three coils are used, each two adjoining coils counteract each other, and the shunt field is produced by the third coil. The bars $f^3$ are therefore magnetized here in the same manner as in the construction shown in Fig. 1.

What I claim is:

An electro-magnet comprising a body provided with poles forming part of a cylinder and with a yoke forming the axis of such cylinder; a coil surrounding said yoke and arranged approximately concentric with said poles; a series of horse-shoe-shaped iron bars disposed above the portion of the coil left free by the poles to form auxiliary magnets, the ends of the said bars being held at a suitable distance from the yoke of the main magnet; and diamagnetic material securing said bar ends in position, whereby magnetic shunt fields are formed at the end faces of the cylinder near the axis thereof, the neutral zones of the said auxiliary magnets being situated above the outer surface of said coil.

In testimony whereof I have hereunto set my hand in presence of two subscribing witnesses.

ALFRED QUASTENBERG.

Witnesses:
EDMUND SCHULTHEIS,
ALFRED HOFFMANN.

---

Copies of this patent may be obtained for five cents each, by addressing the "Commissioner of Patents, Washington, D. C."